US007586761B2

(12) United States Patent
Baptiste et al.

(10) Patent No.: US 7,586,761 B2
(45) Date of Patent: Sep. 8, 2009

(54) CONVERTER HAVING A PLURALITY OF CHANNELS

(75) Inventors: Thierry Baptiste, Lannion (FR); Clément Legendre, Kermaria Sulard (FR)

(73) Assignee: Harmer-Simmons (France)SAS, Lannion (FR)

( * ) Notice: Subject to any disclaimer, the term of this patent is extended or adjusted under 35 U.S.C. 154(b) by 0 days.

(21) Appl. No.: 11/390,317

(22) Filed: Mar. 28, 2006

(65) Prior Publication Data

US 2006/0221647 A1 Oct. 5, 2006

(30) Foreign Application Priority Data

Apr. 1, 2005 (FR) .................................. 05 03216

(51) Int. Cl.
*H02M 3/335* (2006.01)

(52) U.S. Cl. .............. 363/21.01; 363/21.04; 363/21.12; 363/80

(58) Field of Classification Search ................ 323/282, 323/283, 284; 363/17, 21.01, 21.04, 21.05, 363/21.1, 21.12, 48, 52, 53, 60, 61, 67, 68, 363/79, 80; 307/11, 17, 35, 37, 39
See application file for complete search history.

(56) References Cited

U.S. PATENT DOCUMENTS

| 5,218,521 | A | * | 6/1993 | Augier | 363/56.1 |
|---|---|---|---|---|---|
| 5,367,247 | A | * | 11/1994 | Blocher et al. | 323/222 |
| 5,541,828 | A | * | 7/1996 | Rozman | 363/21.1 |
| 5,903,446 | A | * | 5/1999 | Huillet et al. | 363/17 |
| 6,366,487 | B1 | | 4/2002 | Yeom | |
| 6,426,886 | B1 | * | 7/2002 | Goder | 363/56.1 |
| 6,504,267 | B1 | * | 1/2003 | Giannopoulos | 307/31 |
| 6,552,917 | B1 | * | 4/2003 | Bourdillon | 363/21.12 |
| 6,636,025 | B1 | * | 10/2003 | Irissou | 323/313 |
| 2001/0011881 | A1 | * | 8/2001 | Emori et al. | 320/116 |
| 2002/0008501 | A1 | * | 1/2002 | Telefus et al. | 323/282 |
| 2004/0140793 | A1 | * | 7/2004 | Rodi | 324/76.77 |
| 2006/0097710 | A1 | * | 5/2006 | Xi | 323/282 |

FOREIGN PATENT DOCUMENTS

EP 0 698 959 A1 2/1996

* cited by examiner

*Primary Examiner*—Akm E Ullah
*Assistant Examiner*—M'Baye Diao
(74) *Attorney, Agent, or Firm*—Sughrue Mion, PLLC

(57) ABSTRACT

A converter having a plurality of channels includes a transformer having a primary winding and at least one secondary winding. A first switch connected to the primary winding chops a substantially DC voltage in compliance with a first squarewave periodic signal to form an input signal presenting a positive sequence phase and a freewheel phase. A second switch at the input of one of the channels chops an output signal at the secondary winding corresponding to the channel in compliance with a second squarewave periodic signal. The converter also includes a measurement component for measuring a primary current and connected to the primary winding. The converter further includes a storage component for storing a plurality of measured values corresponding to the primary current, the values being measured at distinct times during the positive sequence phase of the input signal, and also includes a processor for processing the measured values.

9 Claims, 3 Drawing Sheets

CONVERTER HAVING A PLURALITY OF CHANNELS

The present invention relates to the field of converters having a plurality of channels, that make use of chopping in cascade, and that are current limited.

BACKGROUND OF THE INVENTION

Converters Having a Plurality of Channels

A converter having a plurality of channels comprises a transformer having a primary winding and at least one secondary winding. The transformer may comprise a plurality of secondary windings, with each secondary winding corresponding to one or more channels. The transformer may also have only one secondary winding, corresponding to all of the channels of the converter.

FIG. 1 is a schematic diagram of an example of a prior art converter circuit having a plurality of channels.

In addition to the transformer 2 having a primary winding 3, a main secondary winding 4, and an auxiliary secondary winding 5, the converter also includes first switch means. The first switch means may comprise a switch T0, e.g. a transistor, connected to the primary winding 3.

The switch T0 serves to chop a substantially continuous or direct current (DC) voltage (not shown) in compliance with a first squarewave periodic signal Vc1 to form an input signal Ve. The switch T0 is controlled by a primary control device using pulse width modulation (PWM) to control the width of the pulses of the first squarewave periodic signal Vc1.

The converter 1 also comprises demagnetization means (not shown), e.g. an active clamp, or making use of resonant reset, or indeed constituted by a demagnetization winding. The average over one period of the input signal Ve is substantially zero. The input signal Ve presents a freewheel phase corresponding to those times during which the first squarewave periodic signal Vc1 is substantially zero, and a positive sequence phase substantially during the pulses in the first squarewave periodic signal Vc1.

A first output signal V1 on a main channel 7 is of an amplitude that is substantially proportional to the amplitude of the input signal Ve. A rectifier and smoothing circuit 6 serves to obtain a main DC signal V1' from the first output signal V1. The voltage value of the main DC signal V1' is a function of the duty ratio of the first squarewave periodic signal Vc1.

Converters with Chopping in Cascade

The converter presents chopping in cascade, i.e. in addition to the first switch means, the converter includes second switch means at the input of one of the channels, and in this example it includes an auxiliary switch T1. Thus, the device that makes it possible to obtain an auxiliary DC signal V2' from a second output signal V2 on an auxiliary channel 8 is practically identical to the rectifier and smoothing circuit 6 with the exception that the auxiliary switch T1 enables the second output signal V2 to be chopped in compliance with a second squarewave periodic signal Vc2. The second output signal V2 has an amplitude that is substantially proportional to the amplitude of the input signal Ve.

By way of example, the second squarewave periodic signal Vc2 presents pulses of width smaller than the width of the pulses in the first squarewave periodic signal Vc1, the pulses in the second squarewave periodic signal Vc2 terminating for example at the same time as the pulses in the first squarewave periodic signal Vc1. A chopped signal V2r thus presents a non-zero voltage value only during the pulses of the second squarewave periodic signal Vc2. The chopped signal V2r thus presents a waveform that is substantially that of a squarewave periodic signal, with the pulses in the chopped signal being of a width that is smaller than the width of the pulses in the first squarewave periodic signal Vc1.

The auxiliary DC signal V2' is then obtained by rectifying and smoothing the modulated signal V2r. The value of the auxiliary DC signal V2' thus depends in this example on the delay between the rising fronts of the second squarewave periodic signal Vc2 and the rising fronts of the first squarewave periodic signal Vc1.

Current Limitation

The converter may include a circuit for limiting current (not shown), in order to protect components.

Current limitation is frequently performed at the secondary, i.e. the current in the main channel is measured, e.g. by using a measurement resistor known as a "shunt". The voltage across the terminals of the measurement resistor is stored, processed, and forwarded via an optical coupler to the primary control device. The primary control device modifies the value of the duty ratio of the pulses in the first squarewave periodic signal Vc1 as a function of the value of the current as measured in the main channel. Such a loop serves to regulate the current in the main channel with a relatively high degree of accuracy.

Similarly, the current in the auxiliary channel is measured and the value of the duty ratio of the second squarewave periodic signal Vc2 is adjusted or modified as a function of the measured current value.

Current limiting may also be performed on the primary. The current passing through the primary winding, known as the primary current, is measured. Such a current limiter circuit has only a single measurement resistor and is consequently more compact and less expensive than a current limiter circuit acting on the secondary.

The measured value of the primary current gives overall information relating to a plurality of channels. The value of the duty ratio of the pulses in the first squarewave periodic signal Vc1 is adjusted as a function of the value of the primary current.

Nevertheless, if one of the channels should be open-circuit, for example, then the current flowing in that channel will be zero. Given the way energy is converted in a transformer, in particular when the powers for each of the channels are very different, it can happen that current limitation occurs only when the current in the remaining channel is relatively high. Current limitation can then be ineffective in protecting components.

OBJECTS AND SUMMARY OF THE INVENTION

The present invention enables current limitation to be performed on the primary in converter circuits having a plurality of channels, and to do so with better control over the current flowing in each of the channels.

Converter of the Invention

The present invention provides a converter having a plurality of channels and comprising:

a transformer comprising a primary winding and at least one secondary winding;

first switch means connected to the primary winding, the first switch means serving to chop a substantially DC voltage in compliance with a first squarewave periodic signal so as to form an input signal, the input signal presenting a positive sequence phase and a freewheel phase;

second switch means at the input of one of the channels, the second switch means serving to chop an output signal at the secondary winding corresponding to said channel in compliance with a second squarewave periodic signal; and measurement means for measuring a primary current and connected to the primary winding.

According to the invention, the converter further comprises:

storage means for storing a plurality of measured values corresponding to the primary current, the values being measured at distinct times during the positive sequence phase of the input signal; and processor means for processing the measured values.

The primary current varies over time, in part because the second switch means provide a discontinuity in the primary current during the positive sequence phase. By measuring the primary current twice at different times during the positive sequence phase, and by storing the two measurements, the converter of the present invention can evaluate the current in a manner that is more closely matched to the channels of the converter. Prior art converters performing current limitation via the primary can obtain only overall evaluation of the current in the secondary.

In particular, when the converter of the present invention comprises a main channel, n auxiliary channels, second switch means for each of the auxiliary channels, and means for measuring n+1 measured values, where n is greater than or equal to 1, the current in each of the channels can be evaluated.

Under such circumstances, the converter of the present invention also makes it possible to detect whether the current in any one of the channels is zero.

In addition, since the current in each channel is now evaluated, correction can be performed by modifying the duty ratio of the first squarewave periodic signal, and also by modifying the duty ratio of the second switch means: the converter of the present invention thus enables a response to be adapted to each of the channels.

Nevertheless, the present invention is not limited to converters having n+1 channels, n second switch means and means for storing n+1 measured values, with n being greater than or equal to 1. For example, a converter having three channels, second switch means for one or two of the channels, and storage means for storing only two measured values, still enables two currents to be evaluated: e.g. an overall current and the current in one of the channels.

The storage means may also be used for storing a larger number of measured values than the converter has channels.

The term "distinct times during the positive sequence phase" means that each measurement time is selected in such a manner that the input signal is then within a positive sequence phase, and the measurement times modulo the periodicity of the first squarewave control signal are mutually distinct. The primary current measurements are advantageously taken during a single positive sequence phase of the input signal, but there is nothing against a first measurement being taken during a first positive sequence phase of the input signal and a second measurement being taken during a second positive sequence phase of the input signal, providing the measurement times relating to each of the positive sequence phases are distinct.

The outputs of the means for processing the measured values are advantageously connected to means for controlling switch means selected from the first switch means and the second switch means.

The values of the currents are thus regulated by controlling the duty ratio(s). Advantageously, the processor means enable the first switch means and the second switch means to be controlled in such a manner as to provide a response that is as well adapted as possible. Alternatively, only one or the other of the switch means is controlled.

The present invention is not limited by the way in which control is implemented. The processor means may, for example, be connected to control means of an electronic circuit in order to control the transfer function of said electronic circuit.

The converter circuit of the present invention advantageously comprises exactly two channels.

Current limitation is thus relatively simple to perform, since two measurements of the primary current suffice to evaluate the current in each of the channels.

Nevertheless, the converter could have more than two channels.

For example, the converter could have three channels, each channel corresponding to a respective secondary winding. The converter would then have second switch means at the input of a first auxiliary channel, and third switch means at the input of a second auxiliary channel. The second switch means serve to chop an output signal at the second secondary winding corresponding to the first auxiliary channel, thereby forming a first chopped signal. The first chopped signal presents pulses of width that is smaller than the duration of the positive sequence phases of the input signal. The third switch means likewise serve to chop an output signal at the third secondary winding corresponding to the second auxiliary channel, thereby forming a second chopped signal. The pulse width of the second chopped signal is, for example, smaller than the width of the pulses in the first chopped signal. The switch means may be controlled, for example, in such a manner that the positive sequence phases of the output signal terminate at the same time as the pulses in the first chopped signal and in the second chopped signal.

With such a converter, the primary current varies in time with two discrete steps, each discrete step corresponding to the beginning of a pulse in one of the chopped signals.

By way of example, such a converter may include a discontinuity detector, e.g. including a differentiator circuit, for identifying the discrete steps in order to take measurements of the primary current at corresponding times. The converter also comprises means for storing three measurements per positive sequence phase of the input signal. The current in each of the channels is evaluated on the basis of the stored measurements. The first switch means, the second switch means, and the third switch means can then be controlled accordingly.

The present invention is thus not limited by the number of channels of the converter, nor is it limited by the number of measurements performed per pulse.

The second squarewave periodic signal is advantageously obtained by using a time copy of the first squarewave periodic signal and by applying a delay to the rising fronts of said time copy.

The second squarewave periodic signal thus presents pulses of a width that is smaller than the width of the pulses in the first squarewave periodic signal. The pulses of the first squarewave periodic signal and the pulses of the second squarewave periodic signal terminate at the same time. Such a second squarewave periodic signal is relatively easy to manage. When the converter has only one auxiliary channel, the primary current then varies in relatively simple manner, with a single discrete step.

Nevertheless, the present invention is not limited to the particular waveform of the second squarewave periodic signal.

Advantageously, the converter includes:

means for detecting the rising fronts of the pulses in the first squarewave periodic signal; and means for detecting a maximum value of the primary current during each pulse of the first squarewave periodic signal.

The storage means advantageously comprise:

first storage means for storing a first value corresponding to the value of the primary current at the beginning of the pulse in the first squarewave periodic signal; and second storage means for storing a maximum value corresponding to the maximum value of the primary current.

The rising fronts and the maxima in the primary current can be detected relatively easily using simple components such as resistors and capacitors.

Nevertheless, the present invention is not limited by the presence of means for detecting the rising fronts of the pulses in the first squarewave periodic signal, nor by the presence of means for detecting maxima in the primary current. The storage means may also be used for measuring values other than the first value and the maximum value.

The second switch means may comprise a transistor controlled by a control device.

Such a component is commonly used as a switch. The transistor is simple to control by means of the second squarewave periodic signal.

Alternatively, the second switch means may comprise a magnetic amplifier.

Such a component makes it possible to apply a delay to the rising fronts of the output signal from the secondary winding corresponding to the channel of the second switch means, with the duration of the delay being controllable by means of a control voltage. A magnetic amplifier may be based on an amorphous material. The present invention is not limited by the nature of the second switch means, nor by the nature of the first switch means. By way of example, the first switch means may comprise a switch such as a transistor.

The converter may advantageously have only one secondary winding.

The main channel and the auxiliary channel are both connected to this secondary winding. The second switch means enable the auxiliary channel to be disconnected temporarily from the secondary winding.

Alternatively, the converter may include a plurality of secondary windings. For example, the converter may have one secondary winding for each channel of the converter.

BRIEF DESCRIPTION OF THE DRAWINGS

The invention is described in greater detail below with reference to figures that correspond merely to a preferred embodiment of the invention.

MORE DETAILED DESCRIPTION

It should be observed that elements or portions that are identical or similar in different figures are designed therein by the same reference signs. The various values given are by way of indication only.

Figure 1:
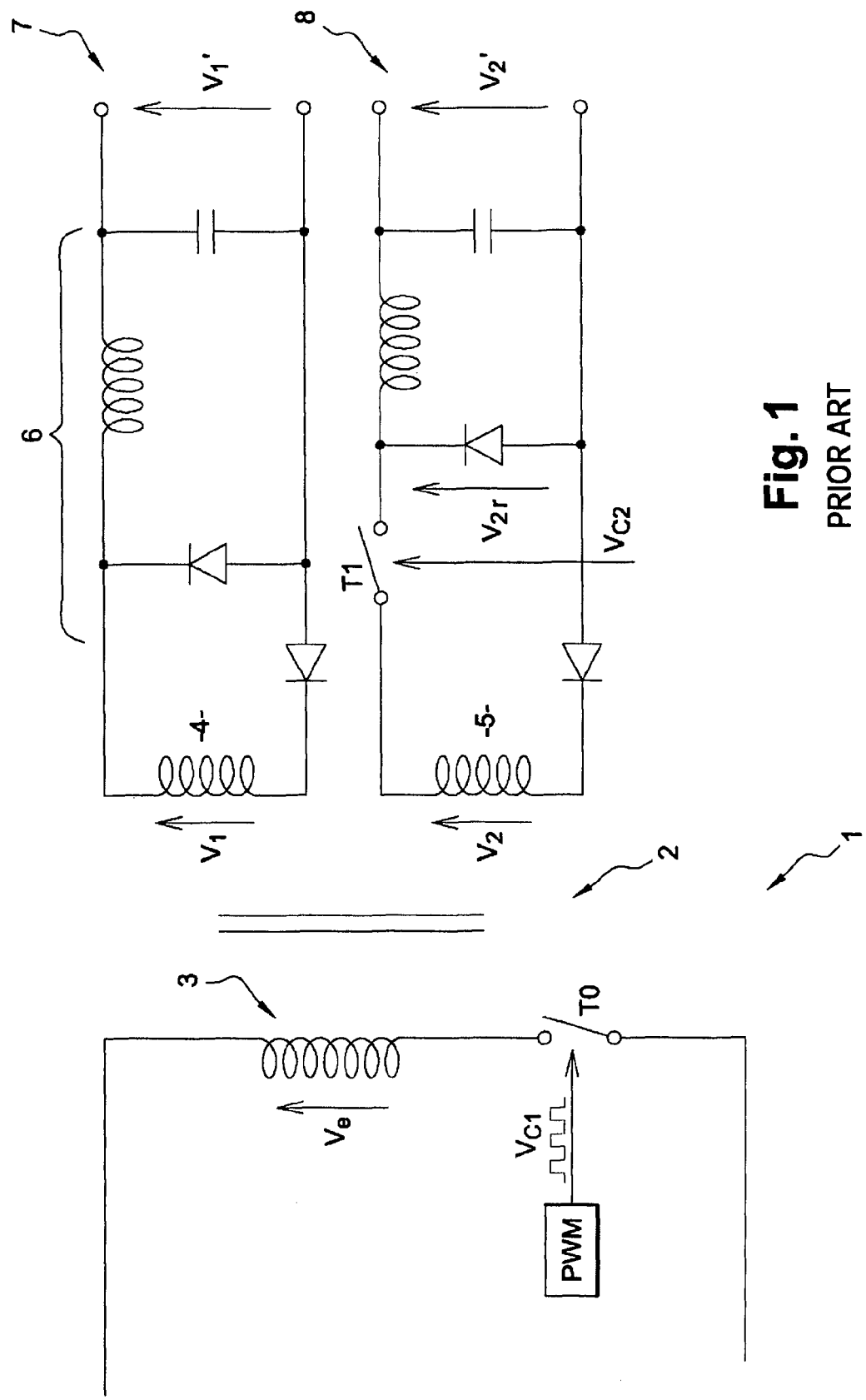
FIG. 1, commented on above, is a schematic diagram of a prior art converter circuit having a plurality of channels and implementing chopping in cascade.
Figure 2:
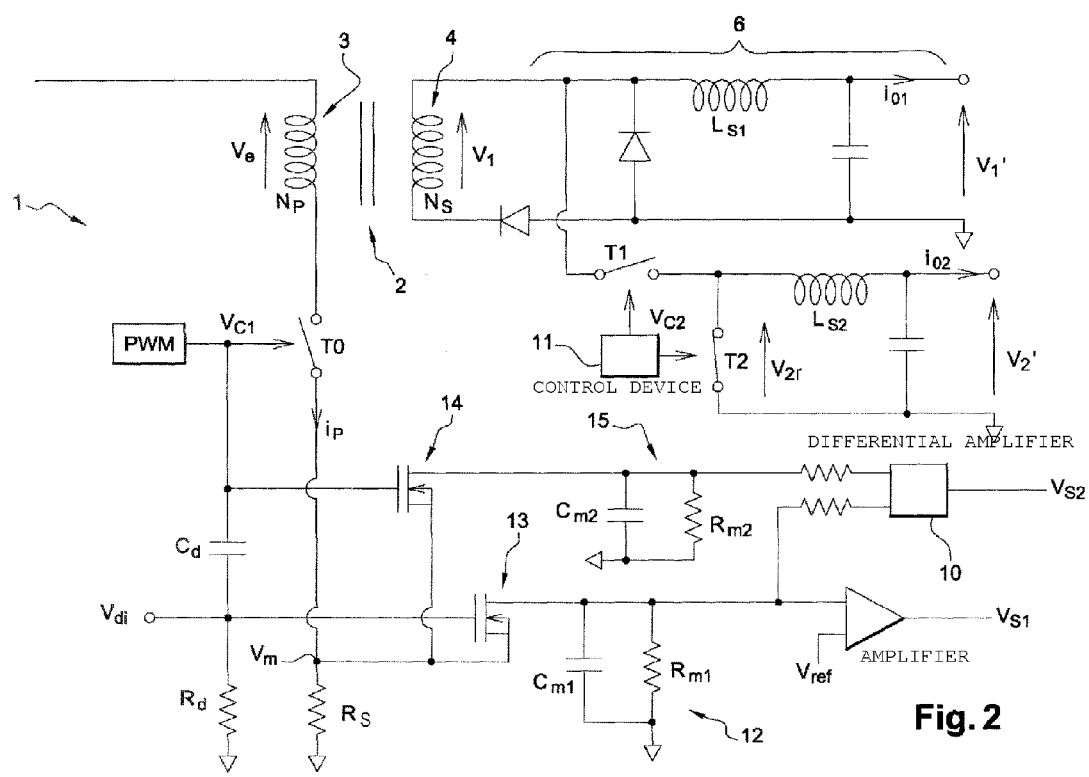
FIG. 2 is a schematic diagram of an example of a converter circuit having a plurality of channels, and implementing chopping in cascade and current limitation, the circuit constituting a preferred embodiment of the present invention.
Figure 3:
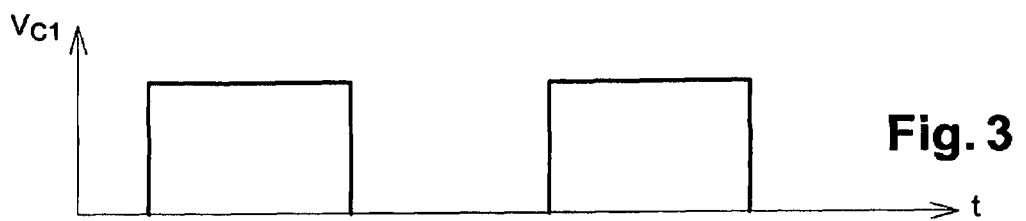
FIG. 3 is a timing diagram for a first squarewave periodic signal in the preferred embodiment of the present invention.
Figure 4:
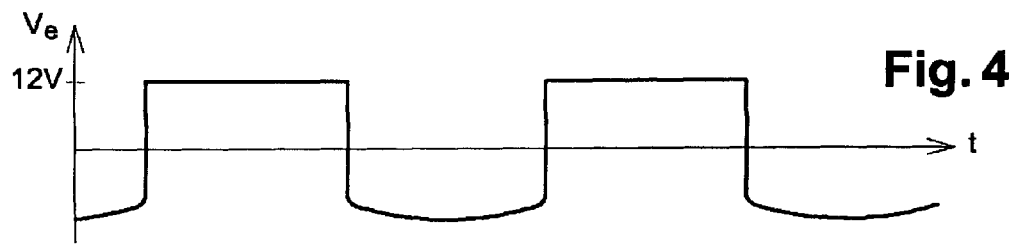
FIG. 4 is an example of a timing diagram for an input signal in the preferred embodiment of the present invention.

The converter circuit 1 comprises a transformer 2 having a primary winding 3 and a secondary winding 4. First switch means, specifically the switch T0, serves to chop a substantially DC input current (not shown) into a first squarewave periodic signal Vc1, as shown in the timing diagram of FIG. 3, so as to form an input signal Ve, as shown in the timing diagram of FIG. 4.

The input signal Ve presents positive sequence phases during the ON periods of the pulses in the first squarewave periodic signal Vc1, and freewheel phases when the first squarewave periodic signal Vc1 is substantially zero.

Figure 5:
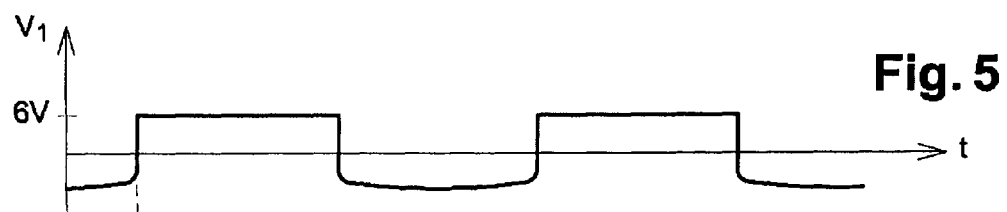
FIG. 5 is an example of a timing diagram for an output signal from the secondary winding in the preferred embodiment of the present invention.

The transformer 2 serves to convert the input signal Ve into an output signal V1 on the secondary winding, as shown in the timing diagram of FIG. 5. The voltage amplitude of the output signal V1 from the transformer on the secondary winding is substantially proportional to the voltage amplitude of the input signal Ve. In this example, the number Np of turns of the primary winding is twice the number of turns Ns in the secondary winding such that in the positive sequence phase in particular, the amplitude of the input signal Ve is twice the amplitude of the output signal V1 from the secondary winding.

A rectifier and smoothing circuit 6 serves to obtain a main DC signal V1' from the output signal V1 on the secondary winding. In this example, the pulses of the first squarewave periodic signal Vc1 are of a duration that is substantially equal to one half-period, such that for an input signal Ve having an amplitude of about 12 volts (V) in the positive sequence phase, the amplitude of the output signal V1 on the secondary winding is about 6 V in the positive sequence phase, and the main DC signal V1' has an amplitude of about 3 V.

The converter is a converter implementing chopping in cascade, i.e. it has second switch means, in this case a second switch T1, and a third switch T2 operating in alternation, serving to chop the output signal V1 on the secondary winding in compliance with a second squarewave periodic signal Vc2.

In the preferred embodiment, each switch comprises a transistor.

Figure 6:
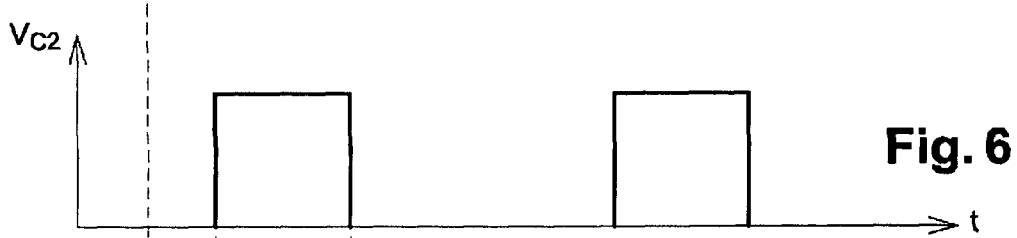
FIG. 6 is an example of a timing diagram for a second squarewave periodic signal in the preferred embodiment of the present invention.

The second squarewave periodic signal Vc2 shown in the timing diagram of FIG. 6 is obtained in this example by using a time copy of the first squarewave periodic signal Vc1 and by applying a delay of one-sixth of a period to the rising fronts of the copy. A control device 11 for controlling the second and third switches T1 and T2 is thus connected to a primary PWM control device which controls the widths of the pulses of the first squarewave periodic signal Vc1.

Figure 7:
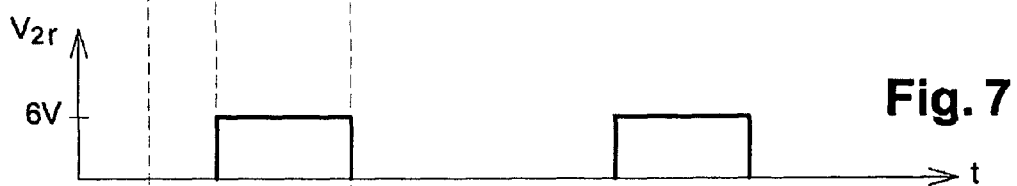
FIG. 7 is an example of a timing diagram for a signal chopped by the second switch means in the preferred embodiment of the present invention.

When the second squarewave periodic signal Vc2 is zero, the second switch T1 is open and the third switch T2 is closed, such that a chopped signal V2r shown in the timing diagram of FIG. 7 is then zero. During the pulses of the second squarewave periodic signal Vc2, the second switch T1 is closed and the third switch T2 is open, in such a manner that the chopped signal V2r then has substantially the same amplitude as the output signal V1 on the secondary winding.

The chopped signal V2r thus presents pulses having a duration that is shorter than the duration of the positive sequence phases in the output signal V1 on the secondary winding. After smoothing, an auxiliary DC signal V2' has an amplitude that is lower than the amplitude of the main DC signal V1', and in this case an amplitude of about 2 V.

Figure 8:
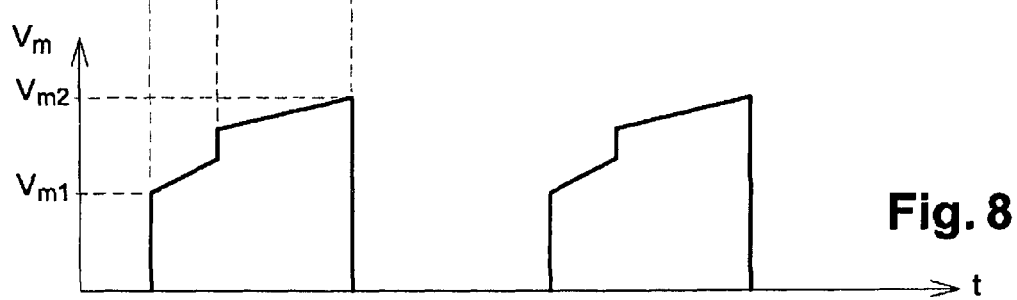
FIG. 8 is an example of a timing diagram for a signal proportional to the primary current in the preferred embodiment of the present invention.

The primary current $i_p$ flowing in the primary winding 3 can be measured by means of a measurement voltage Vm measured across the terminals of a measurement resistor Rs. The measurement voltage Vm as shown in the timing diagram of FIG. 8 varies over time in a manner that differs depending on the states of the switches T0, T1, and T2.

When the first switch T0 is open, the measurement voltage Vm is zero.

When the first switch T0 is closed and the second switch T1 is open, the primary current $i_p$ approximately satisfies an equation of the following type:

$$i_p = i_{01} \times \frac{Ns}{Np} + \left(\frac{Ve}{Lp} - \frac{Ns}{Np}\frac{V1' - V1}{Ls1}\right)t$$

where:

$i_{01}$ designates the current in the main channel;

t designates time, time being taken to be zero at the beginning of the positive sequence phase under consideration;

Lp designates the induction of the primary winding 3; and

Ls1 designates the induction of the rectifier and smoothing circuit 6 in the main channel.

With the first switch T0 still closed, when the second switch T1 is closed, the primary current $i_p$ approximately satisfies an equation of the type:

$$i_p = i_{01} \times \frac{Ns}{Np} + \left(\frac{Ve}{Lp} - \frac{Ns}{Np}\frac{V1' - V1}{Ls1}\right)t + i_{02} \times \frac{Ns}{Np} - \frac{Ns}{Np}\frac{V2' - V2r}{Ls2}t$$

where:

$i_{02}$ designates the current in the auxiliary channel; and

Ls2 designates the induction of the smoothing circuit in the auxiliary channel.

By taking a first measurement of the primary current $i_p$ at the beginning of the pulse of the first squarewave periodic signal Vc1, and a second measurement of the primary current $i_p$ at the end of the pulse, it is possible to estimate both the current flowing in the main channel and also the sum of the currents flowing in the main channel and in the secondary channel. Processor means, in this example constituted by a differential amplifier 10, enable the current flowing in the auxiliary channel to be estimated by subtracting the second and first measurement values.

The processor means are connected to the PWM primary control device and to the control device 11, respectively via a main control signal Vs1 and an auxiliary control signal Vs2.

The measurements of the primary current $i_p$ are performed in this example at the beginning of the pulse and at the end of the pulse. The converter 1 has means for detecting the rising fronts of the pulses in the first periodic signal to identify the beginnings of the pulses in the primary current.

The means for detecting the rising fronts of the pulses in the first squarewave periodic signal are constituted in this example by a detector resistor Rd and a detector capacitor Cd connected in series. The detection voltage Vdf across the terminals of the detector resistor Rd passes through a maximum on each rising front in the first periodic signal Vc1. The detection voltage Vdf controls the state of a first transistor 13, itself situated between the measurement resistor Rs and first storage means 12. The first storage means 12 in this example comprise a first storage resistor Rm1 and a first storage capacitor Cm1 connected in parallel. On each pulse in the first squarewave periodic signal the voltage across the terminals of the storage capacitor Cm1 takes on substantially the same value as the measurement voltage Vm when the detection voltage Vdf is at its maximum, i.e. at the beginning of a pulse in the first squarewave periodic signal Vc1. The first storage means 12 thus serve to store a first voltage value Vm1 corresponding to the value of the primary current at the beginning of the pulse in the first squarewave periodic signal Vc1.

In order to detect the end of each pulse in the first squarewave periodic signal Vc1, a second transistor 14 is controlled directly by the first periodic signal Vc1. The second transistor 14 connects the second storage means 15 to the measurement resistor Rs. The second storage means 15 comprise a second storage resistor Rm2 and a second storage capacitor Cm2 connected in parallel. The second transistor 14 conducts so long as the pulse in the first squarewave periodic signal Vc1 lasts, i.e. on each period the storage means 15 store the maximum value Vm2 of the measurement voltage Vm. The maximum value of the primary current $i_p$ is thus detected and stored for each pulse in the first squarewave periodic signal Vc1. With the primary current $i_p$ in this embodiment being at a maximum at the end of a pulse, a measurement is thus achieved of the primary current $i_p$ at the end of a pulse.

The first value Vm1 and the second value Vm2 as stored in this way are then processed in order to evaluate the current flowing in each of the channels, in such a manner as to enable suitable control to be applied subsequently.

What is claimed is:

1. A converter having a plurality of channels and comprising:

a transformer comprising a primary winding and at least one secondary winding;

first switch means connected to the primary winding, the first switch means serving to chop a substantially DC voltage in compliance with a first squarewave periodic signal so as to form an input signal, the input signal presenting a positive sequence phase and a freewheel phase;

second switch means at the input of one of the channels, the second switch means serving to chop an output signal at the secondary winding corresponding to said channel in compliance with a second squarewave periodic signal;

measurement means connected to the primary winding for measuring a primary current at distinct times during the positive sequence phase of the input signal to obtain a plurality of measured values;

storage means for storing said plurality of measured values of the primary current; and processor means for processing said plurality of measured values of the primary current in order to evaluate the secondary current flowing in each of said plurality of channels.

2. A converter according to claim 1, in which the processor means are connected to control means for controlling the switch means, the switch means being selected from the first switch means and the second switch means.

3. A converter according to claim 1, having exactly two channels.

4. A converter according to claim 3, in which the second squarewave periodic signal is obtained by using a time copy of the first squarewave periodic signal and by applying a delay to the rising fronts of said time copy.

5. A converter according to claim 4, comprising:
   means for detecting the rising fronts of the pulses of the first squarewave periodic signal;
   means for detecting a maximum value of the primary current during each pulse of the first squarewave periodic signal; and
   in which the storage means comprise:
      first storage means for storing a first value corresponding to the value of the primary current at the beginning of a pulse in the first squarewave periodic signal; and
      second storage means for storing a maximum value corresponding to the maximum value of the primary current.

6. A converter according to claim 1, in which the second switch means comprise a transistor controlled by a control device.

7. A converter according to claim 4, in which the second switch means comprise a magnetic amplifier.

8. A converter according to claim 1, and having only one secondary winding.

9. A converter according to claim 1, and having one secondary winding for each channel of the converter.

* * * * *